May 13, 1969    D. L. WALCHLE ETAL    3,443,845
COMPOSITE MOLDED PLASTIC ARTICLES AND THE
METHOD FOR PRODUCING SAME
Filed June 27, 1966     Sheet 1 of 2
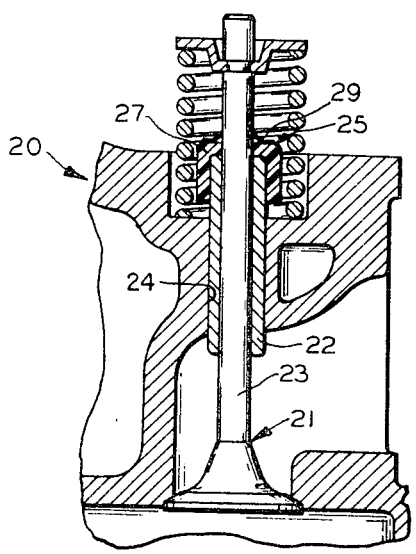
FIG. 1
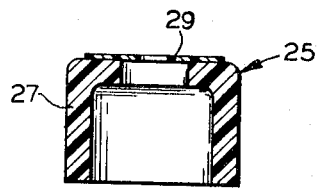
FIG. 2
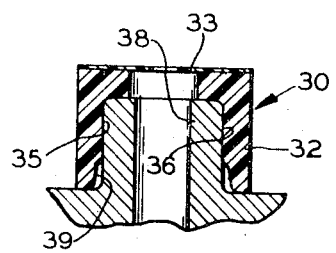
FIG. 3
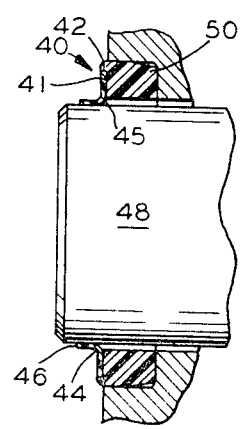
FIG. 4
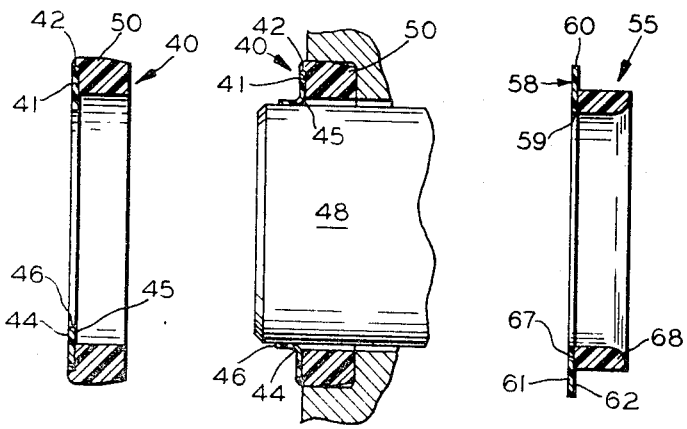
FIG. 5    FIG. 6
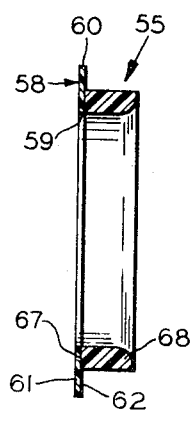
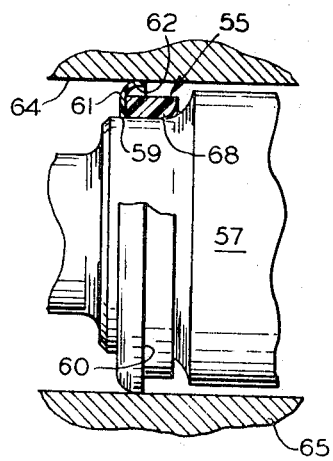
FIG. 7
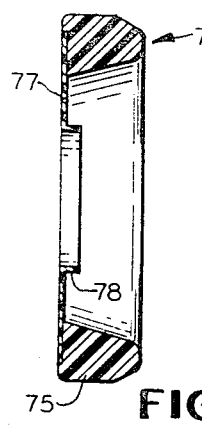
FIG. 8
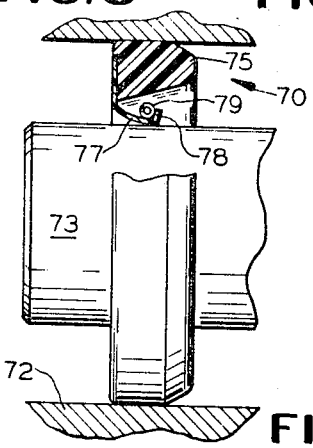
FIG. 9
INVENTORS
DAVID L. WALCHLE
RAYMOND A. HUDSON
STEPHEN A. SEKULICH
BY
ATTORNEY

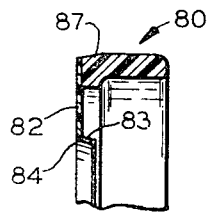
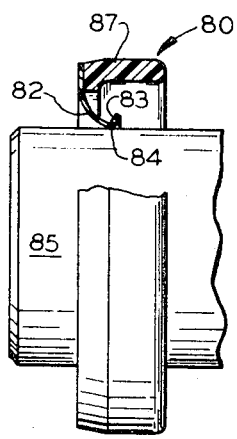
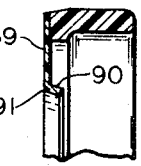
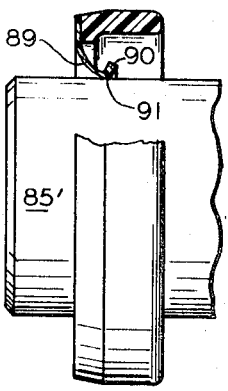
FIG. 10    FIG. 11    FIG. 12    FIG. 13
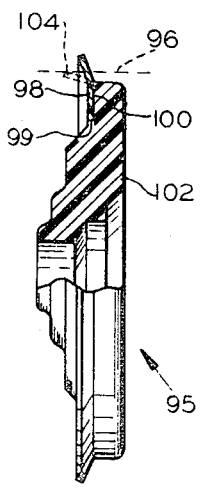
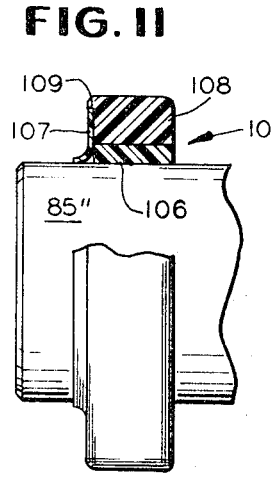
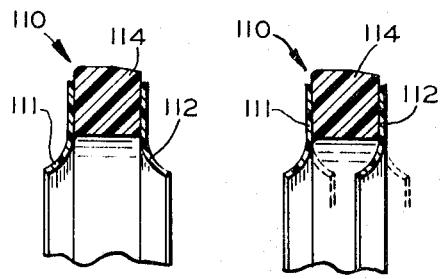
FIG. 14    FIG. 15    FIG. 16    FIG. 17
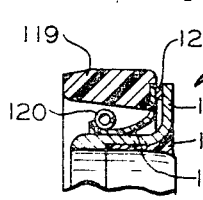
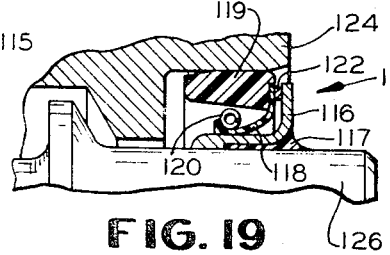
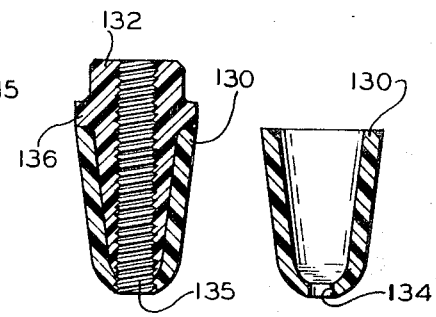
FIG. 18    FIG. 19    FIG. 21    FIG. 20
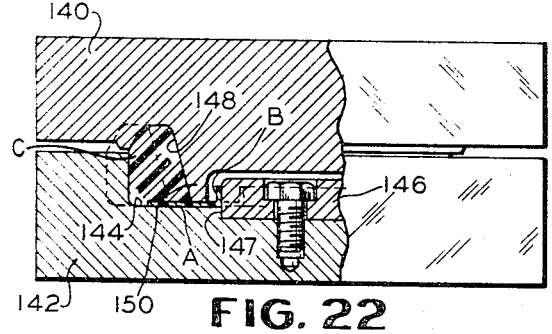
FIG. 22

United States Patent Office 3,443,845
Patented May 13, 1969

3,443,845
COMPOSITE MOLDED PLASTIC ARTICLES AND THE METHOD FOR PRODUCING SAME
David L. Walchle, Milan, Mich., Raymond A. Hudson, Albany, Ga., and Stephen A. Sekulich, Clarkston, Mich., assignors to The Mather Company, Toledo, Ohio, a corporation of Ohio
Filed June 27, 1966, Ser. No. 560,661
Int. Cl. F16c *17/00, 21/00, 29/00*
U.S. Cl. 308—3.5                           15 Claims

ABSTRACT OF THE DISCLOSURE

A preformed tetrafluoroethylene resin part to which a different plastic is directly molded and bonded to form a rigid backing or housing means for the tetrafluoroethylene resin part. One example of such an article is an annular lip seal assembly in which the lip part is a flexible preformed tetrafluoroethylene ring and the backing or housing therefor is a phenolic plastic annulus molded directly to one or more surfaces of said ring.

Summary of the invention

Generally speaking, the molded plastic article comprises a preformed element of reinforced polytetrafluoroethylene having spaced side walls which may be relatively close together to render the same flexible, at least one side wall, and in some instances the outer peripheral edge being deep etched to improve the bonding characteristics thereof, such element having a comparatively hard, rigid thermoplastic or thermosetting resin backing capable of being molded or formed in a suitable mold on the element and directly bonded thereto, without the use of adhesives, in intimate contact with an adjacent side wall thereof in a manner to prevent deterioration of the element. After molding and bonding of the parts to form a unitary structure, the same may be subsequently annealed or otherwise heat treated to pre-shrink the other plastic prior to use.

Objects of the invention

A primary object of the invention is to produce a new, economical, effective, efficient and simple method for directly bonding a plastic to a tetrafluoroethylene resin part without the use of an adhesive, thereby eliminating the adhesive applying step of prior methods.

An object of the invention is to provide a preformed or molded part of a polytetrafluoroethylene compound with a hard or rigid backing member of rubber, thermoplastic or thermosetting plastic in intimate contact with at least one surface of the part.

Another object of the invention resides in the provision of a method for forming rigid backing members on preformed bearing means by molding or casting such backing members directly on the bearing means so that at least a side of the bearing means which has previously been etched to render it susceptible to direct bonding will adhere to the backing member to support and retain the bearing means.

Another object of the invention is to provide an annular tetrafluoroethylene resin bearing or sealing means with a backing member by molding or casting the backing material to at least one face portion of the bearing or sealing means at temperatures to produce a direct bond between the bearing means and backing member.

Brief description of the views

The above mentioned and other features, objects, and advantages, and a manner of attaining them are described more specifically below by reference to embodiments of the invention shown in the accompanying drawings, wherein:

FIG. 1 is a fragmentary vertical sectional detail view of an engine cylinder head showing one embodiment of a seal according to the invention incorporated therewith:

FIG. 2 is an enlarged vertical sectional detail view of the seal assembly shown in FIG. 1;

FIG. 3 is a fragmentary detail view of a sealing unit similar to FIG. 2 but showing another type backing member for a modified valve guide;

FIG. 4 is a vertical sectional detail view of another sealing unit incorporating a modified form of the invention;

FIG. 5 is a vertical fragmentary sectional detail of the sealing unit shown in FIG. 4 installed between a housing and shaft;

FIG. 6 is a fragmentary vertical sectional detail view of another embodiment of the invention incorporated for use in the bore of a housing;

FIG. 7 is a fragmentary view of the unit of FIG. 6 installed on a shaft and assembled in the housing bore;

FIG. 8 is a fragmentary sectional detail view of another sealing unit which incorporates a modification of the invention;

FIG. 9 is a fragmentary detail of the sealing unit shown in FIG. 8 installed between a housing and shaft;

FIG. 10 is a sectional detail view of a still further modified version of the invention;

FIG. 11 is a fragmentary detail view of the unit shown in FIG. 10 installed on a rotary shaft;

FIG. 12 is a view similar to FIG. 10 but showing a slightly modified form of lip seal;

FIG. 13 is a view similar to FIG. 11, showing the lip seal in FIG. 12 installed on a rotary shaft;

FIG. 14 is a sectional detail view of an offset cup seal incorporating the present invention for use in a piston and cylinder assembly;

FIG. 15 is a fragmentary detail view of a combined bearing and lip seal fabricated in accordance with the invention;

FIG. 16 is a sectional detail view of a still further modified seal having a pair of oppositely flexed lip seal elements.

FIG. 17 is a view similar to FIG. 16, but showing the lip seals flexed in the same direction and showing the lip seals flexed in the opposite direction in dotted lines;

FIG. 18 is a fragmentary sectional detail view showing a semiunitized seal structure;

FIG. 19 is a view similar to FIG. 18, but showing the seal structure assembled between a shaft and housing;

FIG. 20 is a vertical sectional detail view of a polytetrafluoroethylene resin cap member suitable for use in a gate valve assembly;

FIG. 21 is a vertical sectional detail view of the cap member of FIG. 20 in which another plastic has been molded to form a gate valve assembly; and FIG. 22 is a fragmentary detail view of a die assembly suitable for performing the bonding method of the invention.

Referring to the drawings, one embodiment of the invention has been shown in FIG. 1 as incorporated for use as a seal for a valve stem of an internal combustion engine having a head 20 in which the valve 21 is mounted. A valve guide 22 for the stem 23 of valve 21 is positioned in a bore 24 in the head 20 and mounted on the upper end of valve guide 22 is a form of seal assembly 25 according to the present invention.

The seal assembly 25 (see FIG. 2) comprises a backing member 27 which is preferably directly bonded to a comparatively thin lip member 29 adapted to engage the valve stem 23. The seal lip 29 is preformed or processed of a synthetic plastic such as reinforced polytetrafluoroethylene capable of having the backing member or housing 27 formed thereon, the housing 27 being of hard rubber, thermosetting or thermoplastic synthetic plastic, or the like, having a molding temperature lower than that of the polytetrafluoroethylene. The polytetrafluoroethylene may be reinforced with glass fibers, powdered bronze, or the like. Thermosetting phenolic resins have been found highly satisfactory for housing 27 due to their ability to directly bond to reinforced polytetrafluoroethylene or other tetrafluoroethylene resins. Housing 27 may be an annulus or ring of generally rectangular cross-section as shown in FIGS. 1 and 2 with the lip 29 located on one side face thereof. At least the contact face of the lip 29 is etched, as later described, prior to having the phenolic or like backing member formed and bonded thereto. The backing member 27 may be molded of thermosetting phenolic plastic, such as "Bakelite," and/or thermoplastic plastics such as "Delrin," "nylon," or the like, which may be bonded thereto during the molding process to firmly unite the two elements in accordance with the method hereinafter described.

As shown in FIG. 3 another form of valve stem seal assembly 30 is comprised of a backing member 32 bonded directly to a lip member 33 initially of flat annular shape which is flexed during assembly on the stem of the valve 21. The backing member 32 is molded so as to have a press fit area 35 for engagement with a reduced diameter or press fit surface portion 36 at the upper end of valve guide 38, and an adjacent relief area 39 which permits the seal assembly 30 to be aligned with the guide press fit surface 36 before being pressed thereon. Such arrangement has been found to eliminate breakage during assembly.

Referring to FIGS. 4 and 5 of the drawings, another embodiment of the invention has been illustrated wherein an annular contactor in the form of a lip seal assembly 40 is shown. The seal 40 includes an annular lip member 41 having a peripheral portion or outer edge 42, substantially parallel adjacent sides 44 and 45 and an inner edge 46. Due to its comparatively thin cross-section, the sealing lip 41 is readily applied to a shaft, plunger or like cylindrical member 48, as shown in FIG. 5, the diameter of member 48 being greater than that of the inner edge 46 to flex the lip 41 upon assembly. Thus, side 45 for example, may have bearing contact on member 48 when used as a dirt seal.

In the FIG. 4 and FIG. 5 form of the invention, the backing member 50 is molded to the lip member 41 on face 45 and peripheral edge 42, these surfaces having been deep etched prior to having the backing member 50 bonded thereto.

As shown in FIGS. 6 and 7 an oil seal assembly 55 may be applied to a shaft 57, the lip member 58 having peripheral inner and outer edges 59 and 60 and adjacent side faces 61 and 62. The lip member is flexed inwardly upon assembly of the shaft in the bore 64 of housing 65. In this instance, the edge 67 of backing member 68 is bonded directly to a face 62 of the lip member 58 adjacent its inner edge 59.

Another embodiment of the invention is shown in FIGS. 8 and 9 in which a seal assembly indicated generally at 70 is positioned between a supporting casing 72 and a shaft 73. The assembly 70 is inclusive of a phenolic plastic annular housing or backing member 75. As in the previously described form of the invention, one of the members such as the outer or backing member 75 is molded to the peripheral portion of an annular contactor in the form of an annular lip seal 77. The lip seal 77 may be preformed of reinforced polytetrafluoroethylene or the like and the backing member 75 may be of another synthetic plastic molded thereto so that the peripheral portion and one of the annular sides of lip 77 is bonded to the member 75 during the molding process. The backing member 75 is heat and pressure formed of material having a lower melting temperature than that required to form the lip member 77.

The seal 77 is initially formed with an inturned annular flange portion 78, the lip 77 being flexed upon assembly with shaft 73 to the position shown in FIG. 9. To insure positive contact of the lip 77 with the shaft, a spring such as garter spring 79 may be applied within the flexed end of the lip 77 adjacent the flange 78.

A modification of the lip seal assembly 70 of FIGS. 8 and 9 is shown in FIGS. 10 and 11 wherein it will be noted that the seal 80 is inclusive of a lip member 82 having an initially obtusely disposed annular flange portion 83 provided with an edge 84 for substantially line contact engagement with a shaft or the like such as shaft 85. The edge 84 is accurately produced so as to be free of nicks or scratches to provide a leakproof lubricant seal without the use of spring means to insure contact with a shaft surface, for example. Backing member 87 is bonded directly to one face only of lip member 82.

FIGS. 12 and 13 illustrate a generally similar form of the invention shown in FIGS. 10 and 11 except that the lip 89 has been modified by increasing the thickness of the flange 90 but maintaining the sharp edge 91 for line contact engagement with the outer surface of shaft 85′. As in the previous form of the invention, the lip 89 is bonded directly to the backing member when the latter is molded thereto.

A still further embodiment of the invention is shown in FIG. 14 incorporated in a piston 95 and cylinder 96 construction (shown by a dotted line) wherein a preformed cup-like seal 98 which may also be of reinforced polytetrafluoroethylene resin of generally annular form has its inner peripheral portion 99 and one of its adjacent annular sides 100 molded to a disk-like case 102 of lower melting temperature plastic than the material of the seal 98. As in the previous forms of the invention, the disk 102 is molded onto and in intimate contact with the seal 98 at a temperature below the deterioration temperature of the seal 98 material. The outer peripheral portion of the seal 98 may be flexed as at 104 to provide cylinder contacting flanged portion. Due to the inherent flexibility of the relatively thin seal 98, the portion 104 is readily displaced in the direction for wiping contact along the cylindrical inner surface of the cylinder 96.

In FIG. 15 is illustrated a combined bearing and seal assembly 105 in which a bearing portion 106 and a lip member 107 are each formed of polytetrafluoroethylene, each member being etched prior to having the phenolic body or backing member 108 molded thereto. As in the case of the forms shown in FIGS. 4, 5, 8 and 9, the peripheral outer edge 109 is also bonded to the backing member 108 when the latter is molded thereto.

FIGS. 16 and 17 illustrate a combination seal assembly 110 comprised of a pair of flexible lip members or contactors 111 and 112 bonded directly to opposite side faces of a backing member 114. Due to the inherent flexibility of the lips 111 and 112, they may be oppositely flexed as shown in FIG. 16 to provide a lubricant and dirt seal, for example, or both may be flexed in one direction as shown in full lines, or in the other direction as shown in broken lines, as in FIG. 17, to provide a double seal.

In FIGS. 18 and 19 a semi-unitized seal assembly 115 has been shown as including dust or dirt seal portion comprised of a radially flanged wear sleeve 116 in which is positioned a silicone static seal element 117. A lubricant seal portion may be provided by an annular lip member 118 bonded directly to a backing element 119, the lip 118 being urged into sealing contact with the outer surface of sleeve 116 by means such as the garter spring 120. The lubricant seal assembly portion may be generally similar to that shown and described in connection with FIGS. 8 and 9. Interposed between the flange of sleeve 116 and the backing member 119 is a gasket 122 for initially positioning the member 119 with respect to wear sleeve 116 when the assembly 115 is installed between the bore in housing 124 and a shaft 126. Gasket 122 may be of comparatively soft material to permit the lubricant seal to become adjusted concentrically with respect to the dirt seal, particularly during initial relative movement therebetween.

Other composite plastic articles formed of a preformed tetrafluoroethylene resin part to which a different plastic backing or supporting part is directly bonded are contemplated. By way of example, the gate valve plug or seal shown in FIGS. 20 and 21 comprises a preformed seal portion 130 of tapered cup-shape having an open upper end and a rounded bottom end recessed at 134. Portion 130 may be formed of a suitable tetrafluoroethylene resin such as reinforced polytetrafluoroethylene. The interior and upper edge surfaces of seal portion 130 are deep etched prior to the direct bonding thereto of a core 132 of another plastic material to provide a rigid backing or support for the portion 130. Centrally of core 132 may be provided a threaded core 135 for receiving a threaded operating shaft (not shown). A flange 136 may be provided during molding of core 132, the lower edge of which flange 136 is directly bonded to the upper edge of portion 130.

*Method*

The method of forming the parts or articles shown in FIGS. 1 through 21 comprises the steps of (1) forming the polytetrafluoroethylene part, which part may be reinforced with glass fibers, powdered metal or the like, (2) deep etching at least a surface of the part in a solution of solid sodium metal in anhydrous liquid ammonia, (3) directly bonding the backing material to the etched surface in a molding press, and (4) heat treating or annealing the final bonded part or article.

The etching step is preferably preformed by immersing the polytetrafluoroethylene part in liquid ammonia in which is placed the solid sodium metal. The liquid ammonia dissolves only the amount of sodium it needs to remove a portion of the fluorine while leaving free carbon to which the phenolic or other resin readily adheres. So-called deep etching, up to about .003″ requires about 20 seconds, or until the tetrafluoroethylene resin turns black, after which the part is washed in water. Any surfaces not required to be etched may be coated with paraffin, although it has been found that if the entire part is etched the bearing surface, for example, will wear off the free carbon left by the etching, immediately upon use, thus providing a good sealing surface.

The heat treating or annealing step is preformed to shrink or size the phenolic or other plastic backing element prior to installation as well as to reduce the effect of heat shock when the article is in use. An example of an annealing cycle suitable to properly condition a phenolic plastic cased or backed article which will be subjected to a maximum environmental temperature of 350° F., follows:

*Temperature/time cycle*

(1) 70° F.–200° F.—15 minutes at 200° F.
(2) 200° F.–250° F.—15 minutes at 250° F.
(3) 250° F.–275° F.—15 minutes at 275° F.
(4) 275° F.–300° F.—30 minutes at 300° F.
(5) 300° F.–375° F.—8 hours (minimum) at 375° F.
(6) 375° F.—70° F.—6 hours (approximately)

The time required for the temperature to raise from one range to the next, in steps 1 through 5, is approximately five minutes.

Referring now to FIG. 22, a suitable die mechanism for use during the step of forming and bonding the backing to a sealing lip has been somewhat diagrammatically illustrated and includes upper and lower and/or male and female dies 140 and 142, respectively. Lower die 142 is provided with a cavity 144 in which may be positioned a preformed sealing lip member A of generally annular shape, the inner peripheral edge of which may be formed with an annular flange portion B. The member A may be located by means of a removable and replaceable insert 146 having an outer periphery 147 corresponding to the inner edge of the lip member A.

The upper die 140 may also have a cavity portion 148 terminating in an annular foot or holddown portion 150 for clamping the member A in position in the lower die cavity prior to the molding and bonding thereto of a suitable backing material of phenolic plastic C or the like. The phenolic or other plastic may be preformed or soft formed prior to being placed in the die cavities.

From the foregoing it will be noted that each form of the invention may be produced by a generally similar method, namely, by providing a preformed part or article of heat and wear resistant plastic such as may be made of polytetrafluoroethylene resins, suitably reinforced. The part may be molded, machined or otherwise produced and is subsequently deep etched on at least one surface, then placed in a die so that at least such one surface portion may have bonded directly thereto and without the use of an adhesive, a plastic material backing member having an appreciably lower molding or forming temperature than the processing temperature of the preformed part. During molding, a backing or supporting member is produced which is comparatively hard or rigid so that the unitized structure may be mounted in a casing or other support. The temperature used to mold the backing member on the other part produces a bond between such part and the backing or housing to prevent leakage between the elements when the same is used as a fluid sealing unit. In other forms of the invention such bond insures intimate contact between the two materials to support or retain the part in its backing or supporting member.

While there is described above the principles of this invention in connection with specific devices and method, it is to be clearly understood that this description is made only by way of example and not as a limitation to the scope of this invention.

What is claimed is:

1. A composite plastic lip seal comprising a preformed polytetrafluoroethylene plastic part having an unsupported flexible portion and a supported portion having an etched surface, and a different and rigid plastic part directly molded to said surface to form an integral bond therewith to support said supported portion of said polytetrafluoroethylene plastic part.

2. An article according to claim 1 wherein said polytetrafluoroethylene plastic surface is etched to a depth of about .003 of an inch.

3. An article according to claim 1 wherein said different plastic is a phenolic plastic.

4. A seal of the lip type for sealing contact with a cylindrical surface comprising:
    (1) a preformed annular polytetrafluoroethylene means having an annular flexible lip portion and an annular supported portion having at least one side wall etched, and
    (2) a molded plastic rigid annular backing member directly bonded to said one etched side wall for supporting said supported portion of said polytetrafluoroethylene means.

5. A seal according to claim 4 wherein said lip portion extends radially outwardly from said backing member.

6. A seal according to claim 4 wherein said lip portion extends radially inwardly from said backing member.

7. A seal according to claim 6 wherein said lip portion has an annular flange providing a seat.

8. A seal according to claim 7 including a resilient garter means resting in said seat for urging said lip into engagement with said cylindrical surface.

9. A double lip seal according to claim 4 wherein said backing member has two spaced sides, and an annular polytetrafluoroethylene means having a said lip portion is bonded to each of said sides.

10. A bearing member having a seal according to claim 4, said bearing member including a polytetrafluoroethylene bearing ring also bonded to said backing member.

11. A seal according to claim 4 including a wear ring between said lip portion and said cylindrical surface.

12. A seal according to claim 4 wherein the part of said lip portion which contacts said cylindrical surface is substantially a smooth circular line.

13. A seal according to claim 4 wherein said cylindrical surface is a valve stem.

14. A seal according to claim 4 wherein said cylindrical surface is the inside of a cylinder.

15. A seal according to claim 4 wherein said cylindrical surface is a shaft.

References Cited

UNITED STATES PATENTS

| | | | |
|---|---|---|---|
| 2,736,585 | 2/1956 | Riesing | 277—153 |
| 2,804,324 | 8/1957 | Stallings | 277—153 |
| 2,930,643 | 3/1960 | Mastrobattista | 277—212 X |
| 2,946,710 | 7/1960 | Fields. | |
| 2,991,808 | 7/1961 | Siegmann. | |
| 3,304,221 | 2/1967 | Eggleton. | |
| 2,765,023 | 10/1956 | Fagg. | |
| 2,789,063 | 4/1957 | Purvis. | |
| 2,886,480 | 5/1959 | Deakin | 264—265 |
| 2,941,824 | 6/1960 | Hoyer | 277—227 |
| 3,023,120 | 2/1962 | Goldsmith. | |
| 3,067,078 | 12/1962 | Gluck | 156—2 X |
| 3,120,960 | 2/1964 | Pippert | 277—212 X |
| 3,138,503 | 6/1964 | Taraud | 156—8 X |
| 3,181,990 | 5/1965 | Reiling | 264—274 X |
| 3,236,573 | 2/1966 | Donnellan | 308—238 |
| 3,243,236 | 3/1966 | Graham | 308—3 |
| 3,306,621 | 2/1967 | Fisher | 308—3.5 X |
| 3,306,791 | 2/1967 | Nye | 156—3 |
| 3,311,966 | 4/1967 | Shaheen | 156—3 |
| 3,355,787 | 12/1967 | Sullivan | 308—72 |

FOREIGN PATENTS

| | | |
|---|---|---|
| 1,263,384 | 12/1961 | France. |
| 974,421 | 11/1964 | Great Britain. |

EDGAR W. GEOGHEGAN, *Primary Examiner.*

LUCIOUS L. JOHNSON, *Assistant Examiner.*

U.S. Cl. X.R.

156—3; 277—212, 227; 308—36.1

UNITED STATES PATENT OFFICE
CERTIFICATE OF CORRECTION

Patent No. 3,443,845                                                  May 13, 1969

David L. Walchle et al.

It is certified that error appears in the above identified patent and that said Letters Patent are hereby corrected as shown below:

Column 5, line 19, "core" should read -- bore --; lines 34 and 48, "preformed" each occurrence, should read -- performed --.

Signed and sealed this 21st day of April 1970.

(SEAL)
Attest:

Edward M. Fletcher, Jr.                              WILLIAM E. SCHUYLER, JR.
Attesting Officer                                                Commissioner of Patents